March 29, 1966 N. C. HEKIMIAN 3,243,714

VACUUM TUBE PHANTASTRON SWEEP GENERATOR

Filed March 5, 1964

INVENTOR

Norris C. Hekimian,

BY [signature]

ATTORNEY

United States Patent Office 3,243,714

Patented Mar. 29, 1966

3,243,714
VACUUM TUBE PHANTASTRON SWEEP GENERATOR

Norris Carroll Hekimian, Kensington, Md., assignor to the United States of America as represented by the Secretary of the Army Filed Mar. 5, 1964, Ser. No. 349,780
3 Claims. (Cl. 328—248)

Figure 1:
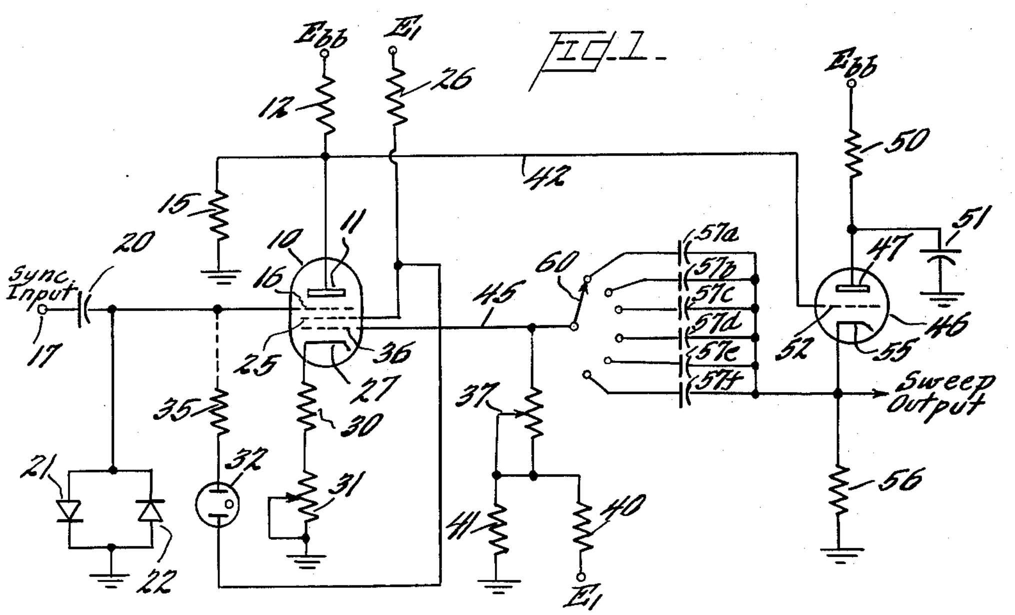

The invention described herein may be manufactured and used by or for the Government for governmental purposes without the payment to me of any royalty thereon.

This invention relates to a vacuum tube phantastron sweep generator and more particularly to an improvement in a vacuum tube phantastron sweep generator.

The phantastron sweep generator is a well-known device that can be employed to generate very linear sawtooth voltage waveforms. As such, it is used for time-base sweeps in oscilloscopes and radar equipment, precise-time-interval generators, and as part of analog-to-digital converters, to name but a few of its applications. In a typical phantastron sweep generator using a pentode vacuum tube, it was discovered that with the sweep near the end of its duration, sync signals arriving at the suppressor were causing pretriggering distortion. While the sweep would not actually terminate because of the sync signals, it would become distorted. The distortion was especially severe with a pattern of many pulses and with a sync pattern either derived from these pulses or from some other source with a large number of pulses during the latter part of the sweep cycle.

Therefore, in using the phantastron, care must usually be taken to prevent additional triggering pulses from reaching it after it has once been triggered into operation and before it has completed its full cycle of operation. In applications where the timing relations are such that the incoming trigger pulses may occur during this interval, some kind of protection must be used if distortion of the sawtooth is to be avoided and the desired linearity of the time-voltage relationship is to be realized. Should trigger pulses be permitted to arrive at the phantastron during its cycle of operation, the sawtooth will be distorted by what appear as superimposed pulses, destroying the linearity and accuracy of the sweep.

It is an object of this invention to provide a new and improved vacuum tube phantastron sweep generator.

It is another object of this invention to provide a new and improved vacuum tube phantastron sweep generator in which pretriggering distortion is eliminated.

It is a further object of this invention to provide an extremely simple, compact and economical way of eliminating pretriggering distortion in a vacuum tube phantastron sweep generator.

With these and other objects in view, a vacuum tube phantastron sweep generator, having an incoming sync signal, embodying the invention may include inhibiting means for eliminating pretriggering distortion in the sweep output due to the incoming sync signal.

More specifically, in one embodiment of the present invention, a vacuum tube phantastron sweep generator is provided having inverse-parallel-connected silicon diodes connected to the incoming sync signal. One of the diodes has its cathode grounded. The phantastron sweep generator also includes a pentode to which the sync signal is applied, the pentode including a screen grid and a suppressor grid with a neon bulb in series with a carbon resistor connected across these two grids.

In the operation of the generator, when an incoming sync signal is applied, the generator starts its sweep cycle. The inverse-parallel-connected silicon diodes limit the voltage of the incoming sync signal. The neon bulb and carbon resistor control the cathode-grounded diode to inhibit the incoming sync signal completely until the sweep cycle is completed, thereby eliminating any pretriggering distortion.

Figure 2:
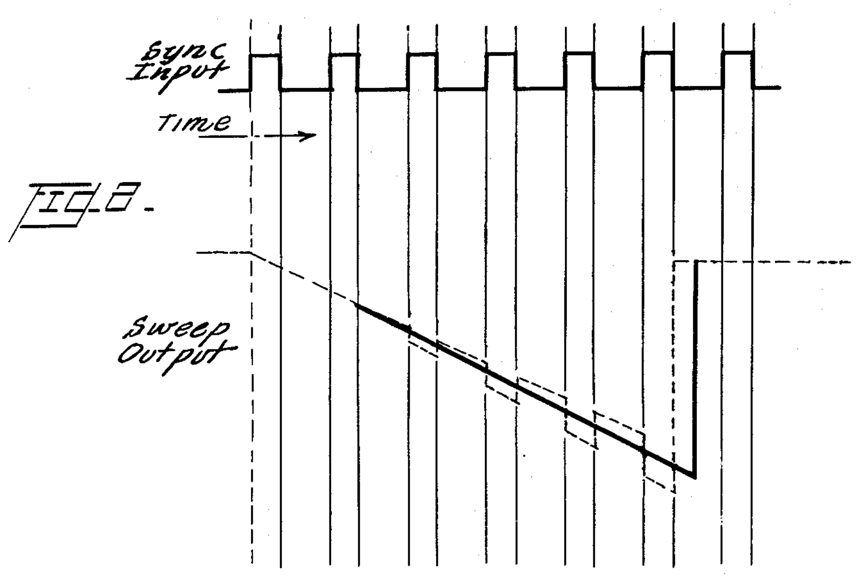

Other objects and advantages of the present invention will be apparent from the following detailed description when considered in conjunction with the accompanying drawing, wherein:

FIG. 1 is a vacuum tube phantastron sweep generator showing an embodiment of the present invention, and FIG. 2 is an illustration of the sync input and the sweep output of the vacuum tube phantastron sweep generator of FIG. 1, with and without the present invention.

Referring to FIG. 1 the numeral 10 designates a phantastron tube, such as 6AS6 pentode, shown in a conventional cathode-coupled circuit. A plate 11 is connected to a plate supply (designated $E_{bb}$) through a resistor 12 and also through a resistor 15 to a reference potential designated by a ground connection. A suppressor grid 16 is connected through an input capacitor 20 to a terminal 17 to which is applied a sync input signal. Also connected to the terminal 17 are two inverse-parallel-connected silicon diodes 21 and 22, the cathode of the diode 21 being grounded. A screen grid 25 is connected to a resistor 26 to which is applied a potential $E_1$, the potential $E_1$ being less than the potential $E_{bb}$. A cathode 27 is connected to ground through a resistor 30 and a potentiometer 31. Across the suppressor grid 16 and the screen grid 25 is connected a neon bulb 32 in series with a carbon resistor 35. A control grid 36 of the pentode 10 is connected to a second source of the potential $E_1$ through a potentiometer 37 and a resistor 40. A resistor 41 is connected between the upper side of the resistor 40 and ground. A feedback path is provided between conductors 42 and 45 from the plate 11 of the pentode 10 to the control grid 36 thereof by way of a triode cathode follower 46. A plate 47 of the triode 46 is connected to a second source of the potential $E_{bb}$ through a resistor 50 and also to ground through a capacitor 51, a grid 52 is connected to the plate 11 of the pentode 10, and a cathode 55 is connected to ground through a resistor 56. The cathode 55 of the triode 46 is also connected to the control grid 36 of the pentode 10 through one of a plurality of capacitors **57*a*, 57*b*, 57*c*, 57*d*, 57*e* and 57*f* which are of different capacitance. The desired capacitor can be selected by means of a switch 60. The capacitors are chargeable through a charging circuit consisting of the potentiometer 37, the resistors 40 and 41, and the potential $E_1$. The pentode 10 is effective to discharge a desired one of the capacitors 57*a*, 57*b*, 57*c*, 57*d*, 57*e* or 57*f***, depending on the time required for developing the retrace portion of the sweep voltage.

The operation of a vacuum tube phantastron sweep generator is well known as described in section 5.15 of "Waveforms," David Sayre, Radiation Laboratory Series, vol. 19, McGraw-Hill, 1949. More particularly, in the circuit in FIG. 1, phantastron operation is achieved by cathode coupling. Starting with the cathode current at a value sufficient to cause conduction, the operation of the phantastron will now be described.

Initially, owing to the cathode current, the suppressor grid 16 is very negative with respect to the cathode 27, thus cutting off plate current flow. Since the bias on the control grid 36, which is positive due to the potential $E_1$ being applied through the charging circuit consisting of elements 37, 40 and 41, causes a large cathode current to flow, all of this current is diverted to the screen grid 25. Thus the conditions are: Zero plate current, maximum cathode and screen current, maximum cathode voltage, minimum screen voltage and maximum plate voltage. When a trigger pulse of positive polarity is applied to the terminal 17, the suppressor grid 16 is momentarily driven positively to the point where plate current can flow. This partitions the cathode current so that less current flows to the screen, and raises the screen voltage. At the same time, the plate voltage falls towards ground, this change being coupled back to the control grid 36 by the triode 46 and one of the capacitors **57*a* through 57*f*. This negative drive to the control grid 36 decreases the cathode current to the point where the cathode bias no longer keeps the suppressor grid 16 at the plate current cut-off level, and the pentode 10 behaves as a normal amplifier. Because of the capacitive feedback from the plate 11 to the control grid 36 via the triode 46**, the circuit behaves as a Miller integrator and provides a very linear "run-down" to the point where the plate voltage can no longer decrease.

At the instant that the potential of the plate 11 reaches its minimum value, the further negative feedback to the control grid 36 is halted, and the positive bias tends to increase the cathode current. This action is cumulative, since the increase in positive bias will intend to increase cathode current and result in a cutting off of the plate current by the bias on the suppressor grid 16. Cathode current is then diverted to the screen grid 25 and the initial state is reached. This action is very rapid, since it is regenerative. The cathode follower triode 46 provides quick recovery of charge on whichever of the timing capacitors **57*a* through 57*f* is in the circuit, since otherwise all of the current would have to be discharged through resistor 12 and would require considerable time before a full recovery was achieved. It should be appreciated that any signals impressed on the tube during the sweep cycle could result in distortion, since they would be amplified by the pentode 10** in the usual manner.

The inverse-parallel-connected silicon diodes 21 and 22 were initially used as voltage limiters for the incoming synchronizing trigger pulses. However, the diode 21, with its cathode grounded, serves the additional purpose of inhibiting the incoming sync pulses when the screen voltage is high. The neon bulb 32 in series with the carbon resistor 35 controls this action. When the voltage of screen grid 25 is high, which is only during the sweep cycle, the neon bulb 32 is conducting and the diode 21 is driven well into conduction. The diode 21 is then a low impedance path to ground for any incoming triggers, and thus virtually short circuits them to ground. When the sweep portion has terminated, the voltage of screen grid 25 drops, owing to the large screen current, and the neon bulb 32 is extinguished, since the screen voltage becomes less than the required maintaining voltage for neon. At this point, the diodes 21 and 22 are not inhibited from accepting incoming triggers, and the next arriving trigger pulse can initiate another cycle.

In FIG. 2 are illustrated input and output waveforms of a phantastron sweep generator. The upper curve is a plot of voltage-versus-time for a typical sync input waveform. The lower two curves represent plots of voltage-versus-time for typical sweep output waveforms. The dotted-line curve shows the sweep output of a vacuum tube phantastron sweep generator not employing the present invention. The increasingly greater and greater pretriggering distortions in the form of superimposed pulses can be seen as time increases. This distortion tends to destroy the linearity and accuracy of the sweep. However, when the present invention is employed, a smooth, linear, distortionless sweep output is obtained as shown by the solid-line curve in FIG. 2.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a vacuum tube phantastron sweep generator having an incoming synchronizing signal applied thereto, the improvement which comprises two diodes to which an incoming synchronizing signal is applied and which limit the voltage of the incoming synchronizing signal, a neon bulb in series with a resistor to which the incoming synchronizing signal is also applied, and means for applying an output from the phantastron to the neon bulb and resistor series arrangement for controlling the conduction of the neon bulb and the diodes so that the incoming synchronizing signal is inhibited during the sweep to eliminate pretriggering distortion.

2. In a vacuum tube phantastron sweep generator having an incoming synchronizing signal applied thereto, the improvement which comprises inverse-parallel-connected silicon diodes to which an incoming synchronizing signal is applied and which limit the voltage of the incoming synchronizing signal, one of the diodes having a grounded cathode, a neon bulb in series with a carbon resistor to which the incoming synchronizing signal is applied, and means actuated by the phantastron for varying the conduction of the neon bulb and thereby controlling the conduction of the cathode-grounded diode so that the incoming synchronizing signal is inhibited during the sweep to eliminate pretriggering distortion.

3. In a vacuum tube phantastron sweep generator of the type employing an incoming synchronizing signal to a pentode having a screen grid and a suppressor grid, the improvement which comprises inverse-parallel-connected silicon diodes to which an incoming synchronizing signal is applied, one of the diodes having a grounded cathode for limiting the voltage of the incoming synchronizing signal, and a neon bulb in series with a carbon resistor connected across the screen grid and the suppressor grid of the pentode to control the conduction of the neon bulb and the cathode-grounded diode so that the incoming synchronizing signal is inhibited during the sweep to eliminate pretriggering distortion.

References Cited by the Examiner

UNITED STATES PATENTS

| | | | |
|---|---|---|---|
| 2,562,295 | 7/1951 | Chance | 328—185 |
| 2,814,760 | 11/1957 | Beveridge et al. | 328—184 XR |
| 2,835,867 | 5/1958 | Golden. | |

OTHER REFERENCES

Millman and Taub: Pulse and Digital Circuits, McGraw-Hill, 1956 (p. 221–228 relied on.).

ARTHUR GAUSS, *Primary Examiner.*

I. C. EDELL, *Assistant Examiner.*